US007168923B2

(12) United States Patent
Vasilescu et al.

(10) Patent No.: US 7,168,923 B2
(45) Date of Patent: Jan. 30, 2007

(54) ALTERNATOR FAN

(75) Inventors: Claudiu Vasilescu, Paris (FR); Sébastien Arrighi, Versailles (FR)

(73) Assignee: Valeo Equipements Electriques Moteur, Creteil (FR)

( * ) Notice: Subject to any disclaimer, the term of this patent is extended or adjusted under 35 U.S.C. 154(b) by 101 days.

(21) Appl. No.: 10/488,994

(22) PCT Filed: Sep. 27, 2002

(86) PCT No.: PCT/FR02/03305

§ 371 (c)(1),
(2), (4) Date: Dec. 20, 2004

(87) PCT Pub. No.: WO03/029658

PCT Pub. Date: Apr. 10, 2003

(65) Prior Publication Data

US 2005/0106024 A1 May 19, 2005

(30) Foreign Application Priority Data

Sep. 28, 2001 (FR) .................................. 01 12553

(51) Int. Cl.
*F04D 29/38* (2006.01)
*H02K 9/06* (2006.01)

(52) U.S. Cl. ...................... 416/175; 416/185; 416/203; 416/241 A; 416/244 R; 310/43; 310/62; 310/63

(58) Field of Classification Search ................ 416/181, 416/185, 175, 224, 241 A, 60, 203
See application file for complete search history.

(56) References Cited

U.S. PATENT DOCUMENTS

| | | | | |
|---|---|---|---|---|
| 4,957,414 | A * | 9/1990 | Willingham | 416/241 A |
| 5,693,992 | A * | 12/1997 | Kurusu et al. | 310/63 |
| 5,927,949 | A | 7/1999 | Ogasawara | |

FOREIGN PATENT DOCUMENTS

| | | | |
|---|---|---|---|
| EP | 0 500 442 | A1 | 8/1992 |
| FR | 2 741 912 | | 6/1997 |
| GB | 2 347 276 | A | 8/2000 |

* cited by examiner

*Primary Examiner*—Richard A. Edgar
(74) *Attorney, Agent, or Firm*—Berenato, White & Stavish

(57) ABSTRACT

The invention is a fan for an alternator adapted to be coupled in rotation to the alternator rotor, and being of the type comprising a wheel part and a plurality of fan blades (47, 48) extending from the latter, the fan being moulded in a plastics material on an insert (50) which is preferably of metal and which constitutes the wheel part of the fan and is arranged to provide fastening of the fan on the rotor, being configured so as to constitute a means for increasing the mechanical strenght of the fan; the insert (50, 65) includes at least a portion of a blade (48, 69) of the fan. The invention is useful in the manufacture of a high power cooling fan for a motor vehicle alternator.

11 Claims, 4 Drawing Sheets

ALTERNATOR FAN

FIELD OF THE INVENTION

This invention relates to a fan for an alternator, especially for a motor vehicle. The fan is adapted to be coupled in rotation to the rotor of the alternator, and comprises a wheel part and a plurality of fan blades extending from the latter; the fan is formed by moulding in a plastics material on a mechanical insert, in a material which is mechanically stronger than the plastics material, such as metal, and the insert constitutes the part of the fan by which it is secured on the support.

STATE OF THE ART

Fans of this type are already known and are described for example in the Applicant's French patent No. 2 673 338. In the fan described in that patent, the insert is of metal and is disposed in the wheel part, and serves for fastening of the fans to the rotor, in particular by welding. Given that the fan of plastics material is moulded on the insert with its fan blades, it is possible to make fans which have blades the number, configuration and disposition of which may be chosen according to the application of the fan and the cooling output that they are required to provide.

These fans may be used in alternators of high electrical output, which are liable to produce excessive heating when ventilation is poor.

However, these known fans have the major disadvantages that their manufacture is costly because of the large quantity of plastics material which is necessary, and which is expensive, and also because their mechanical strength is poor, again due to the high mass of plastics material which is used.

OBJECT OF THE INVENTION

An object of the present invention is to propose a fan of the type defined above which does not have the disadvantages just set forth.

In order to achieve this end, there is provided, according to the invention, a fan for an alternator having a rotor, the fan being adapted to be coupled in rotation to the alternator rotor and being of the type comprising a wheel part and a plurality of fan blades extending from the latter; the fan being moulded in a plastics material on an insert, which constitutes the wheel part of the fan which is adapted for fastening the fan on the rotor, wherein the insert constitutes an armature adapted to support the mechanical stresses produced during rotation of the fan, characterised in that the insert includes at least a portion of a blade of the fan, whereby to increase the mechanical strength of the fan and obtain improved adhesion of the plastics material.

The moulded-on fan thus has enhanced mechanical strength because of the insert, which is preferably made of metal and which comprises at least a portion of a blade and consolidates the plastics part of the fan. Similarly the cost of the moulded fan is reduced because the insert, since it comprises at least a portion of a blade, occupies a relatively large space and ensures good mechanical strength, so that the quantity of plastics material which is necessary for the manufacture of the moulded fan is reduced. In addition, the insert determines the form and disposition, and the required number of blades are those desired. The blades may be very close to each other or of complex form, while being robust because the insert carries at least part of a blade of the fan, which enables better anchorage of the plastics material on the insert, and therefore greater homogeneity in the fan, to be obtained. The fan is thus able to rotate at high speeds, to be of high power, and to be less noisy and mounted in a motor vehicle alternator.

The invention is preferably completed by various features set forth as follows, taken alone or in all their technically possible combinations:

The insert extends over at least substantially the complete extent of the wheel part of the fan.

Thus, good mechanical strength of the fan is ensured with a reduced amount of plastics material, the volume of the wheel part being essentially occupied by the insert.

The insert extends radially over at least two thirds of the moulded-on portion of the fan.

Thus, the mechanical strength of the circumferential end of the fan is ensured because this part of the fan, not being moulded in situ, remains very close to the end of the insert, which greatly reduces the mechanical stresses applied on this external part of the fan while it is working in rotation.

The insert has a substantially circular contour at its outer periphery.

The insert has a contour in the form of teeth at its outer periphery.

The fan has two sets of blades, namely a first set consisting of main blades, which are longer than a second set which consists of secondary blades, at least one of which is disposed between two main blades; these secondary blades are part, at least partially, of the insert.

The main blades are part, at least partially, of the insert.

Thus, it can be that the large blades are made from metal plate and the small blades of plastics.

The blades in one set are consecutive.

The insert is made from bent metal plate in the form of a fan having at least one secondary blade or main blade.

The fan is a centrifugal, centripetal, axial, axial-centrifugal or axial-centripetal.

The blades, or the portions of the blades which are not part of the insert, are formed by in situ moulding of a plastics material on the insert.

The blades moulded in plastics material comprise, at least partially, at least one secondary blade located between two main blades.

The faces of the insert are at least partially covered with plastics material.

The secondary blades are at least partly covered with plastics material.

At least the parts of the insert which serve for fastening the fan on its support are free of plastics material.

The fan is an axial fan comprising a plate portion, which carries a cylindrical portion at its outer periphery, and blades which are fixed on the outer face of the cylindrical portion and which constitute at least part of the insert.

The fan is an axial fan comprising a plate portion carrying blades, and the insert extends at least over the extent of the plate portion.

The metallic insert has at least one opening for increasing the mechanical strength of the in situ moulding.

BRIEF DESCRIPTION OF THE DRAWINGS

The invention will be understood more clearly, and further objects, features, details and advantages of it will appear more clearly, in the following explanatory description which is made with reference to the attached diagrammatic drawings, which are given by way of example only to illustrate an embodiment of the invention, and in which.

EXAMPLES OF PREFERRED EMBODIMENTS OF THE INVENTION

Figure 1:
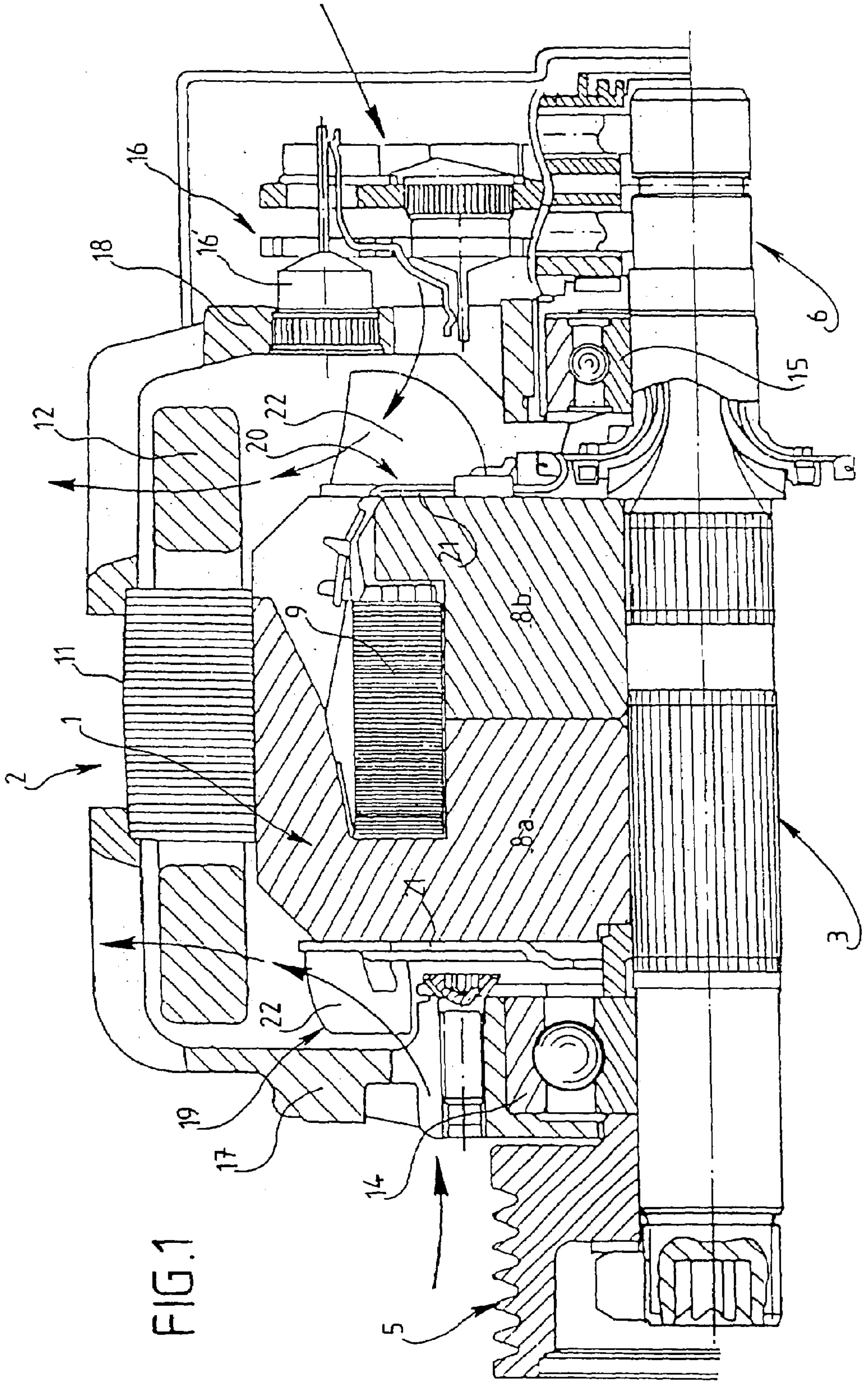
FIG. 1 is a view of a standard alternator in axial cross section.

The sole purpose of FIG. 1 is to recall briefly the general structure of a polyphase alternator with internal ventilation for a motor vehicle heat engine, with a view to putting the invention in its preferred practical context. For an understanding of the invention, it is sufficient to mention that the alternator shown comprises essentially a rotor 1 surrounded by a stator 2 and mounted on a rotor shaft 3 for rotation with the latter, the front end of the rotor shaft carrying in rotation a drive pulley 5, while its rear end carries slip rings (not given a reference numeral) of a collector 6. The pulley 5 is arranged to be coupled to the heat engine of the vehicle in the known way, through a belt drive.

In this example the rotor is of the claw type and comprises two pole wheels designated by the references 8*a* and 8*b*, which have axially oriented teeth offset angularly as between one wheel and the other. The reference numeral 9 designates the excitation winding of the rotor which is mounted between the wheels 8*a* and 8*b*. As to the stator, it is enough to say that it comprises a body 11 formed with internal grooves for the passage of wires or hairpins of the windings 12 of the stator. The windings 12 extend through the body 11, which consists of a stack of laminations, and project axially on either side of the body 11 so as to form a front chignon and a rear chignon (not given reference numerals). The number of windings 12 depends on the application, and in particular on the number of phases in the alternator.

The rotor shaft 3 is supported by a front ball bearing 14 and a rear ball bearing 15, which are arranged respectively in a front bearing wall 17 and a rear bearing wall 18, which in this case have cut-away portions to allow air to circulate. The bearing walls are hollow in form and are so configured that they carry the body 11 of the stator at their outer periphery. Stretchers, which can be seen in the above mentioned document FR-A-2 673 338, join the bearing walls 17 and 18 together to constitute a casing which is arranged to be secured on a fixed part of the vehicle.

The reference numeral 16 designates the conventional rectifier device having diodes 16', for rectifying the alternating current produced by the machine. This rectifier device is carried in this example by the rear bearing wall 18, which also carries a voltage regulator (not visible in FIG. 1) and a brush carrier (partly seen in FIG. 1). The brushes (not given a reference numeral), which are mounted for sliding movement in the brush carriers, are arranged to cooperate with the slip rings of the collector 6. These brushes are connected through wire connections to the ends of the excitation winding 9, while the brushes are connected to the voltage regulator which, in the manner known per se, therefore governs the excitation winding.

It is important to note that the alternator includes a front fan 19 and a rear fan 20, which are fixed in rotation on the front faces of the front pole wheel 8*a* and the rear pole wheel 8*b* respectively. Each fan comprises a wheel part 21 which is applied and fixed on the front face of the supporting pole wheel, together with a plurality of blades 22. The purpose of these fans, which are accordingly disposed close to the front bearing wall 17 and rear bearing wall 18, is to create a flow of cooling fluid, air in the present case, for cooling the hottest working parts of the alternator, such as the diodes 16' of the rectifier device 16, the rolling bearings 14, 15, the rotor winding 1 and the stator windings 12, by passing air through various appropriate apertures in the bearing walls as indicated by the arrows. More precisely, each bearing wall 17, 18 has, in the vicinity of the associated bearing 14, 15, central air inlet apertures facing some of the blades 22, and central outlet apertures facing the appropriate chignon of the windings 12. The fans are fitted radially within the chignon of the windings, given that the rear fan 20 is more powerful than the front fan, because it has to cool the rectifier device 16.

It will be clear that the more the electrical output of the alternator is increased, the more the cooling capacity of the fans must be raised. This increase in electrical output of the rotary machine is sought without any increase in the volume of the machine. This object is achieved by an appropriate configuration of the blades.

Figure 2:
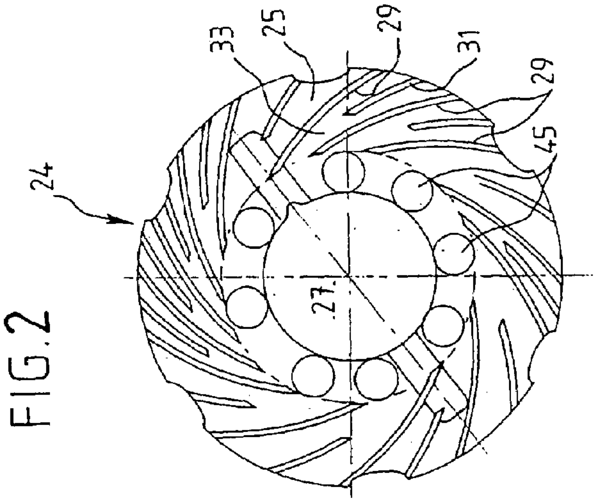
FIG. 2 is a view on the front face of a fan with two sets of blades according to the invention.

FIG. 2 shows a fan which is designed for this purpose. It carries the general reference numeral 24. The fan comprises a substantially flat, circular wheel part denoted 25, which is provided with a circular central hole 27 for passage through it of the alternator shaft indicated at 3 in FIG. 1, together with two sets of fan blades which project axially with respect to the wheel 25 and which consist of a first set of long main blades 29 and a second set of shorter secondary blades 31, each of which is disposed between two long blades 29. This arrangement enables the power of the fan to be increased, and reduces the risk of detachment of the cooling air stream from the blades. In this connection, if the air detaches from the main blades 29, the secondary blades will cause air to be recaptured on the main blades 29. Thus, each secondary blade 31 is disposed in the ventilation channel 33 defined between the two adjacent long blades 29, this channel being divergent going from the inner periphery to the outer periphery of the blades. The wheel 25 constitutes the base of the ventilation channels.

The secondary blades 31, being shorter than the blades 29, are located radially outside the inner periphery of the long main blades 29. The purpose of the blades 31 is to reduce the noise from the electrical machine while increasing air flow and output. The arrangement is such that the secondary blade compresses the coolant fluid so that the latter will be in contact with the main blades 29. Recirculation of the air is thus prevented, and the flow of air is more laminar and takes place with little friction or noise. This arrangement enables the front fan 19 to be omitted if necessary, so that the alternator then has, in a variant, only one fan.

It would also of course be possible to envisage various combinations of arrangements of the secondary blades 31 with the longer main blades 29. Thus, it would be possible to dispose a plurality of secondary blades 31 between the main blades 29. The number of secondary blades disposed between the main blades in the same fan may be either constant or variable. Thus for example, in any one fan, four secondary blades may for example be inserted between two main blades, and then three secondary blades between two further main blades, or there may be any other combination. Equally, it is possible to envisage having a plurality of consecutive main blades 29 which do not have any secondary blades between them. The distribution of the secondary and main blades is determined as a function of the electrical machine to be cooled, whereby to obtain the best cooling effect with minimum aerodynamic noise.

The main blades 29 may be spaced apart circumferentially at regular intervals, or, as in the case shown in FIG. 2, at irregular intervals. The irregular arrangement enables an even greater reduction in operating noise of the fans to be achieved. The same is true for the secondary blades, which may be arranged in an irregular circumferential disposition.

Figure 5:
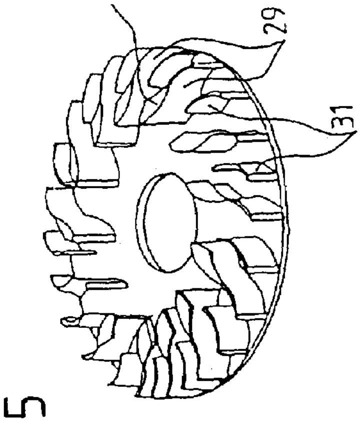
FIG. 5 is a perspective view of another fan with two sets of blades, which can be made in accordance with the invention.

FIG. 5 shows in a perspective view a fan of the same type as in FIG. 2, but here, at least some of the main blades 29 have, overhanging the base of the channels 33, a fin 36 which extends at right angles or in inclined relationship to the blades 29, for the purpose of avoiding any secondary flow of fluid above these blades.

Fans of complex structure, such as those shown in FIGS. 2 and 5, can of course be made by moulding in plastics material. However, as explained earlier herein, this method of manufacture does have the major drawbacks that the fans have a high selling cost and insufficient mechanical strength.

In order to overcome these drawbacks, it is proposed to provide the fans with an insert of a material which is mechanically stronger than the plastics material, and which is preferably of metal.

The insert extends over a substantial extent of the plastics material, which is moulded in situ over this insert.

The metallic insert has to be able to permit the fan to resist mechanical stresses produced during rotation of the fan, such as shear stresses, vibration stresses, torsional stresses, and elongation stresses. These mechanical stresses which are produced during rotation cause the fan to be deformed, essentially in the plastics part which is not formed by moulding on the metallic insert. These deformations can cause mechanical fracture of the moulded-on part of the fan.

The insert must therefore have a geometry such as to enable the moulded part of the fan to have perfect mechanical strength while ensuring that the selling cost is relatively small. The insert has to permit complex blades to be made, such as those in FIGS. 2 and 5, at low cost.

Figure 3:
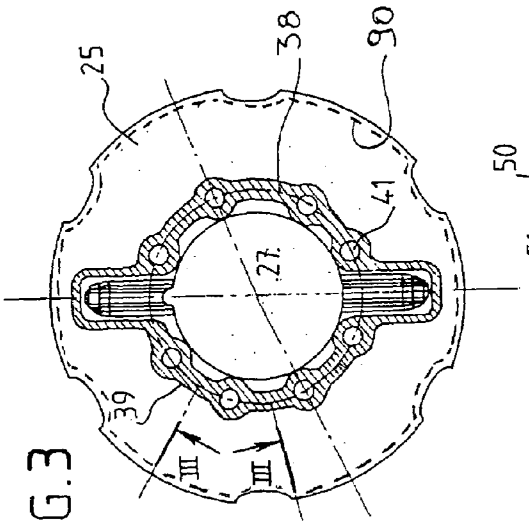
FIG. 3 is a view on the back face of the fan shown in FIG. 2.

In a first embodiment, and according to one feature, the insert extends over practically the whole extent of the wheel of the fan, as is shown in FIG. 3, in which plastics material is moulded in place on the insert. The broken line carrying the reference 90 shows the limit of the insert.

Figure 12:
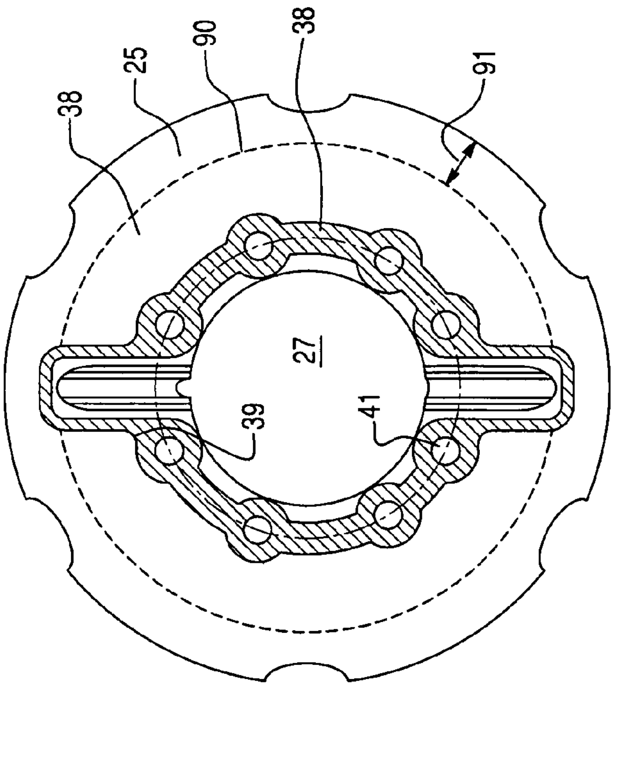
FIG. 12 is a variant of FIG. 3.

FIG. 12 shows another embodiment of the insert with in situ moulding, in which the insert extends radially over at least two-thirds of the moulded-on portion. The remaining portion, not moulded-on, of the fan which lies at the outer periphery, thus has a radial dimension 91 which is low enough to resist the mechanical stresses mentioned above.

Figure 13:
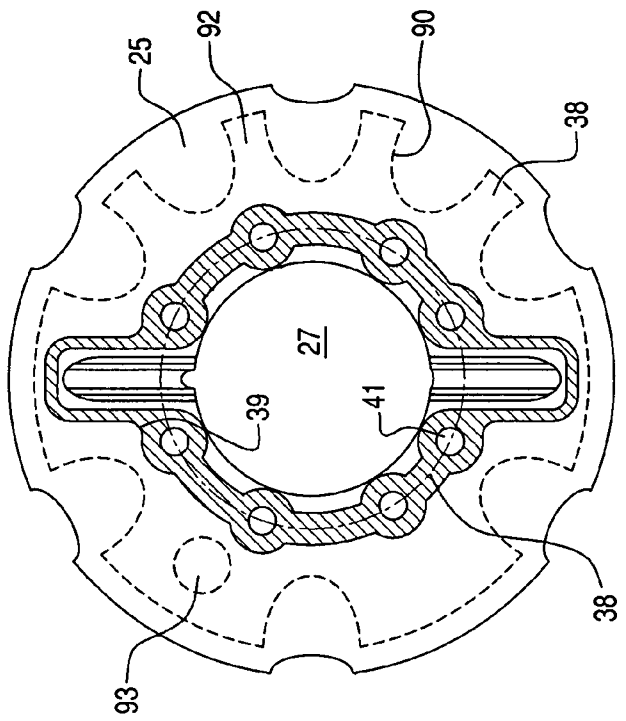
FIG. 13 is a further variant of FIG. 3.

It is also possible to make use of a metallic insert which has an outer peripheral edge that is non-circular, as is shown in FIGS. 3 and 13. Thus, FIG. 13 shows an insert of which the outer peripheral edge is not circular, and is for example in the form of a toothed wheel, with its teeth 92 being able to have either a regular form or otherwise. The geometry of the teeth has to be determined in such a way as to ensure mechanical strength of the fan during high speed rotation.

Equally, the metal insert may have openings 93 to give better mechanical strength to the moulded-on part; the plastics material extends through the openings so as to form pads. The openings 93 are able to reduce the cost of the fan even more, by enabling in situ moulding to be carried out on only one face of the metallic insert. For good mechanical strength, these openings in which the plastics material is moulded in place must be so located as to ensure good mechanical strength.

As will have been understood, the cheapest solution is the one shown in FIGS. 3, 12 and 13, in which the insert occupies essentially all of the wheel part, because it is this configuration that uses the least amount of plastics material, the volume being essentially occupied by the metal insert. The other configurations are also inexpensive as compared with the state of the art, because in order to ensure good mechanical strength, the insert must in all cases occupy a sufficiently large minimum surface, that is to say a surface which is at least greater than in the state of the art.

Figure 4:
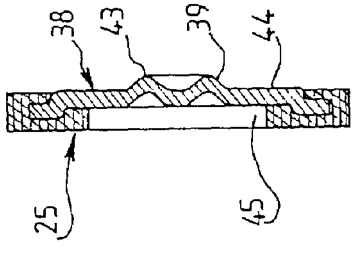
FIG. 4 is a view in cross section along the line III—III in FIG. 3, with the blades omitted.

However, as can be seen from FIGS. 3, 12 and 13, the insert is locally bare, that is to say not covered by plastics material. The bare portion is in the form of a crown indicated at 39 in FIG. 3 and surrounding the central hole 27. FIG. 4 then shows a segment of this crown. It will be noted that this bare portion has two diametrically opposed projecting elements (not given reference numerals). These projecting elements are internally hollow, for passage of wire connectors (not given reference numerals) between the excitation winding 9 and the collector 6 of FIG. 1.

The crown 39 enables the wheel 25 to be fastened on the outer front face of the pole wheel **8*a* or 8*b* of the rotor 1 of the electrical machine, for example by welding. The circular zones 41 which are spaced apart on the crown at practically equal distances circumferentially in the example shown (though this is not obligatory) are welding points, and correspond to local deformations, shown at 43 in FIG. 4**, which project from the application face of the crown on the pole wheel, with the whole of the deformation constituting a welding point.

It is found that on the front face shown in FIG. 2, zones of the insert indicated at 45 which are bare are arranged for fastening of the insert on the rotor. They correspond to the functional zones 43 in FIG. 4.

In the embodiment just described, the insert constitutes nearly the whole of the wheel part of the fan, thereby giving good mechanical strength to the latter.

In accordance with one feature, during the operation of moulding on the insert 38, not all of the set of blades such as are shown in FIGS. 2 and 5 will be formed simultaneously.

More precisely, in accordance with the invention and is best shown in FIGS. 6 to 11, the insert includes at least part of a blade of the fan.

The invention makes use of the insert in order to increase even more the mechanical strength of the fan and obtain better anchoring of the plastics material, that is to say better homogeneity of the fan and better attachment of the plastics material on the insert.

Figure 8:
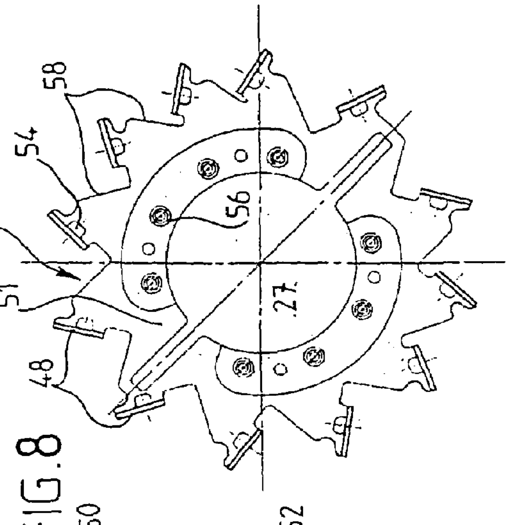
FIG. 8 is a view of the insert shown in FIG. 6, after the short blades have been formed by bending.
Figure 7:
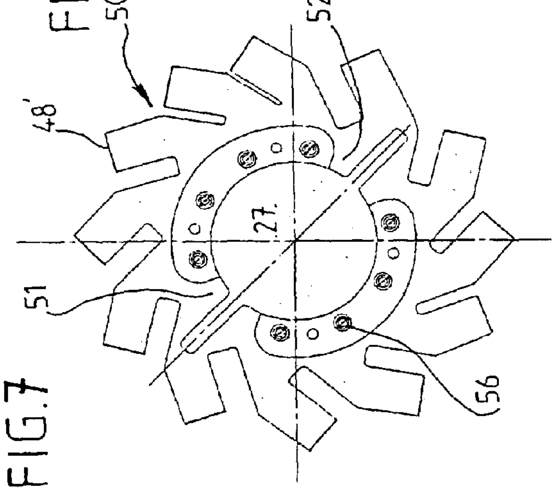
FIG. 7 is a top plan view of the metal insert used in the fan shown in FIG. 6, before bending of the portions which are to form the short blades is carried out.
Figure 6:
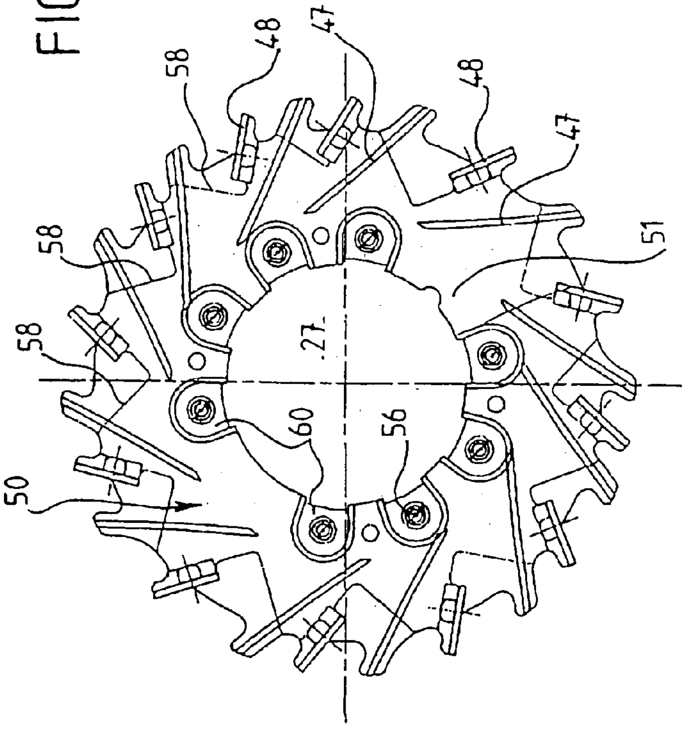
FIG. 6 is a view on the front face of a further embodiment of a fan with two sets of blades according to the invention.

FIGS. 6 to 8 show a first embodiment according to the invention which is of particular advantage for a fan having a pattern of blades of the same kind as is shown in FIG. 2, that is to say a fan with two sets of blades, namely a first set of long main blades, which now carry the reference numeral 47, and a second set of short blades, indicated at 48, each of which is disposed between two long blades as previously shown in FIG. 2. The fan with the blades 47 and 48 therefore has the same advantages as the one in FIG. 2, while having good mechanical strength.

The particular feature of the embodiment of the invention in FIGS. 6 to 8 lies in the fact that the short blades are not obtained by in situ moulding, but form part of the metallic insert, which is now designated by the reference numeral 50.

FIG. 7 illustrates the insert which is in the form of a metal plate carrying at its periphrey cut-out portions 48' which, after having been bent out of the plane of the main portion that constitutes the wheel part of the fan and carries the reference numeral 51, become the short blades 48 seen in FIG. 8. After being bent through an angle of, for example, 90°, the insert itself already constitutes a fan with short blades. The angle could of course be different from 90°, as for example in a helical-centrifugal fan. It is found that, during the conversion from the flat insert shown in FIG. 7 into the fan insert shown in FIG. 8, the blades 48 have been reinforced by grooves 54 which offer improved anchorage of the plastics material on the insert. It should be noted that the blades 48 are spaced apart about the wheel part 50 in an irregular manner; the blades are closer together on the right hand side in FIGS. 6 and 8 than on the left hand side. In order to complete the description of the insert, mention is made of circular emplacements 56 which are arranged for fastening the fan on the rotor. These emplacements 56 are preferably of the same type as the local deformations 43 in FIG. 4. It is also seen that the insert has two diametrically opposed openings for passage of wire connections between the winding 9 and the rings of the collector 6 in FIG. 1.

It is by moulding the plastics material on the insert in situ, as shown in FIG. 7, that the fan shown in FIG. 6 is made with the long main blades 47, which are then in plastics material. In FIG. 6, the line of external contour of the metal insert of FIG. 8 will be seen at 58. In the assembly of the fan, the metal insert is bare in each zone 60 surrounding a fastening location 56. The insert can therefore be fixed on the rotor, for example by welding. It will be appreciated that the said wire connection between the collector 6 and winding 9 is well supported against movement, because the diametrically opposed openings in FIG. 7 become blind openings after the in situ moulding process, the base of these blind openings being closed by the plastics material so that the wires are interposed between the plastics material and the face of the wheel 8*b*.

Figure 9:
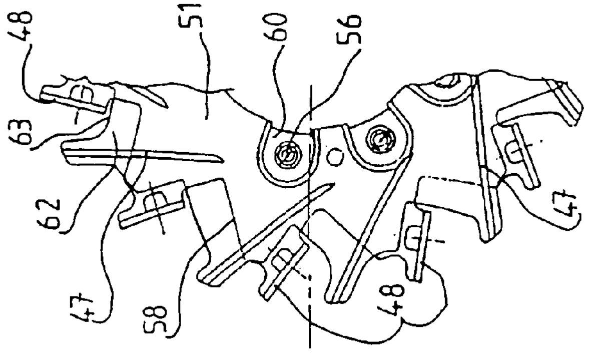
FIG. 9 is a view similar to FIG. 6, showing a further embodiment of the fans shown in FIG. 6.

FIG. 9 is a partial view of another version of the embodiment of fan in FIG. 8, and is distinguished by the fact that even more economies of plastics material are made. In this connection in the case of FIG. 9 the short secondary blades 48 are completely free of the plastics material, as can be seen in the part designated by the reference numeral 63, which is the contour of the plastics material.

In FIGS. 8 and 9, good anchorage of the plastics material is obtained due to the fact that the insert has cut-out portions 48, between which the plastics material is attached. It is of course possible to form openings in the insert, as in FIG. 13.

Figure 10:
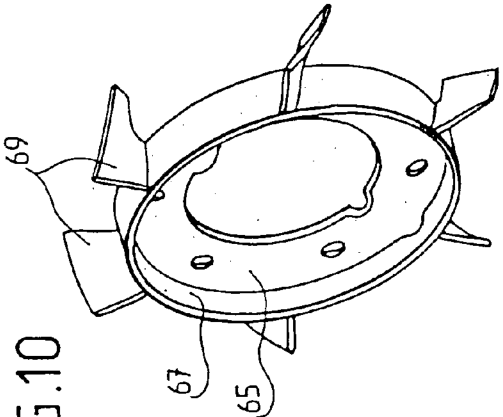
FIG. 10 is a perspective view of an axial fan according to the invention.

FIG. 10 shows that the principle of manufacture of the fan in accordance with the invention enables other types of fan to be obtained, such as the axial fan shown in this Figure, having a central portion in the form of a radial plate with a central hole, carrying at its outer periphery a cylindrical portion 67. Blades 69 project radially with respect to the cylindrical portion 67, and are at least partly carried by the portion 67.

Figure 11:
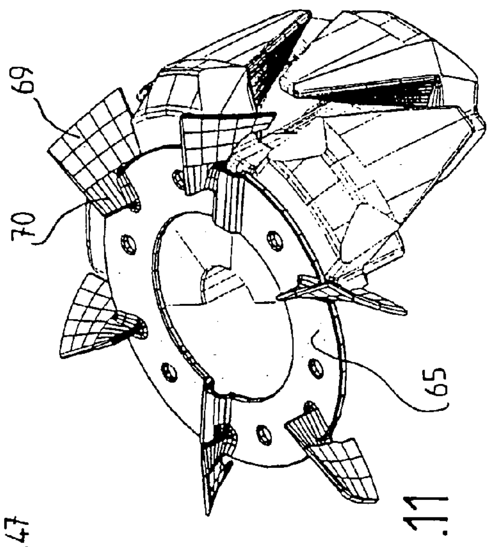
FIG. 11 is a perspective view of another version of the axial fan embodiment.

In this case, at least the central plate portion 65 and at least part of the blades 69 are of metal and are part of the insert, as shown for example in FIG. 11, the remainder, with the cylindrical portion 67 and the remaining part of the blades 69, being moulded in situ. In this Figure, one of the notches for passage of the above mentioned wire connection can be seen.

As in FIG. 3, the insert extends over the full extent of the wheel part of the fan.

FIG. 11 shows a further type of axial fan which is distinguished from that shown in FIG. 10 by the absence of the cylindrical portion 67; the blades 69 are each supported by a radially inner support portion 70 formed on the radially outer peripheral zone of the plate portion 65. As in the case of FIG. 10, at least the central part of the plate portion is of metal, at least a portion of at least one blade is of metal, for example the support portion 70, and forms a part of the insert; the remainder is moulded in situ. It will be noted in FIG. 11 that there are two diametrically opposed deformations (not given reference numerals) in the form of gutters for the passage of the wire connection between the winding 9 and the rings of the collector 6 in FIG. 1. The blades 69 penetrate between two teeth of the pole wheel, part of which is shown and which corresponds to the pole wheel 8*b* in FIG. 1. This arrangement is made possible by the invention.

Preferably, the portions 70 are obtained by bending in such a way that the said portions are hollow internally, which encourages adhesion and therefore the anchoring of the plastics material of the blades 69.

Numerous modifications may of course be made to the embodiments shown, which are given by way of example only. Thus, the blades may be disengaged or be at least partially covered with plastics material. The metallic insert may be fixed on the rotor not only by welding, but in any other appropriate way, for example by riveting, threaded fastening, sweating on the shaft, by screws, or the like.

By contrast with the embodiment shown in FIGS. 6 to 8, in which the insert already has one of the two sets of blades, namely the short blades, it is possible to use inserts with only one blade or only a part of one blade or several blades, or some blades in a set of blades.

Thus, according to the metal surface of the insert which is available for bending the blades, it is possible to make any kind of combination between the blades formed by bending sheet metal with the blades formed by in situ moulding in plastics material. For example, the metal insert may carry long blades only, or only short blades, or again, a combination of the two. The said blades can clearly be disposed at irregular intervals. Thus, the insert may be configured in such a way that it carries only one long or short blade for example.

In the case of the axial fan of FIG. 10, the annular portion which constitutes the cylindrical flange may also be part of the metallic insert, at least partly. It would also be possible in addition to arrange on the insert at least one portion of the blades, the remainder of the latter then being made by in situ moulding. The invention does of course enable any other type of fan to be produced besides centrifugal and axial fans, for example centripetal, axial-centrifugal or axial-centripetal fans.

It should be noted that the invention applies an effective solution to a problem posed by fans before being used in rotary alternators of high power output, with, however, the constraint that volume is not increased. The solution of making fans only by moulding in plastics material has the disadvantage that the manufacturing process is costly, and that the fans thus obtained do not have the required mechanical strength. As to the method of making fans in fabricated metal, which would be appropriate from the points of view of cost and mechanical strenght, it does not enable a configuration of blades to be made which will be able to ensure the necessary cooling performance, that is to say that of two sets of blades in accordance with FIGS. 2, 5 and 6.

It follows from the foregoing that the invention, especially in its embodiment which makes use of a metallic insert which is already in the form of a fan, or with at least one blade, enables fans to be made having the configurations of complex blades which give them increased cooling power, at a relatively low selling cost and with good mechanical strength.

For fans having only one set of blades, but which are very close together and therefore very numerous, or with long or complicated blades, and which cannot therefore be made by bending, a part of the fan can then be made in metal plate and another part in plastics material.

The fan according to the invention can of course be mounted in a reversible alternator or so-called starter alternator, which is able to work also as an electric motor, in particular for starting the heat engine of a motor vehicle, as described in the document WO01/69762. In another version, the fan can be mounted in an alternator which comprises a rotor with projecting poles, as described in the document WO02/054566. The alternator may also be water cooled and be equipped with an axial fan of the type shown in FIG. 11.

The windings of the stator may, as mentioned above, include conductive elements in the form of hairpins, generally U-shaped and with a cross sectin which is preferably rectangular, in the manner described in the document WO02/50976. The fan of the invention enables the head of the hairpins to be well cooled, because it may have the desired form. The alternator may only have a rear fan, due to the power from the fan according to the invention.

The invention claimed is:

1. A fan for an alternator having a rotor, the fan being adapted to be coupled in rotation to the alternator rotor and being of the type comprising a wheel part and a plurality of fan blades extending from the latter, the fan being moulded in a plastics material on an insert, which constitutes the wheel part of the fan and which is adapted for fastening the fan on the rotor, wherein the insert (38, 50, 65) constitutes an armature adapted to support the mechanical stresses produced during rotation of the fan, characterised in that the insert (50, 65) includes at least a portion of a blade (48, 69) of the fan, whereby to increase the mechanical strength of the fan and obtain improved adhesion of the plastics material.

2. A fan according to claim 1, characterised in that it has two sets of blades, namely a first set consisting of main blades (47), which are longer than a second set which consists of secondary blades (48), at least one of which is disposed between two main blades (29, 47), and in that the secondary blades (48) are part, at least partially, of the insert (50).

3. A fan according to claim 1, characterised in that it has two sets of blades, namely a first set consisting of main blades (47), which are longer than a second set which consists of secondary blades (48), at least one of which is disposed between two main blades (29, 47), and in that the main blades (29, 47) are part, at least partially, of the insert (50).

4. A fan according to claim 1, characterised in that it has two sets of blades, namely a first set consisting of main blades (47), which are longer than a second set which consists of secondary blades (48), at least one of which is disposed between two main blades (29, 47), and in that the insert (50) is made from bent metal plate in the form of a fan having at least one secondary blade (48) or main blade (29, 47).

5. A fan according to claim 1, characterised in that the blades (29, 31, 47, 48, 69), or the portions of the blades which are not part of the insert, are formed by in situ moulding of a plastics material on the insert.

6. A fan according to claim 2, characterised in that the blades (29, 31, 47, 48, 69) moulded in plastics material comprise, at least partially, at least one secondary blade (48) located between two main blades (29, 47).

7. A fan according to claim 1, characterised in that the faces of the insert are at least partially covered with plastics material.

8. A fan according to claim 2, characterised in that the secondary blades (31, 48) are at least partly covered with plastics material.

9. A fan according to claim 1, characterised in that at least the parts (39) of the insert which serve for fastening the fan on its support are free of plastics material.

10. A fan according to claim 1, characterised in that it is an axial fan comprising a plate portion (65) carrying blades (69), in that the insert extends at least over the extent of the plate portion (65), and in that at least a portion (70) of at least one blade (69) is part of the insert.

11. A fan according to claim 10, characterised in that it is an axial fan comprising a plate portion (65), a cylindrical portion (67), and blades (69) which are fixed on the outer face of the cylindrical portion (67), in that the insert extends at least over the extent of the plate portion (65), and in that at least part of the cylindrical portion (67) is part of the insert.

* * * * *